United States Patent [19]

Yoshino

[11] Patent Number: 5,329,580
[45] Date of Patent: Jul. 12, 1994

[54] COMMUNICATION TERMINAL ADAPTOR

[75] Inventor: Kanichi Yoshino, Yokohama, Japan

[73] Assignee: Canon Kabushiki Kaisha, Tokyo, Japan

[21] Appl. No.: 770,939

[22] Filed: Oct. 4, 1991

[30] Foreign Application Priority Data

Oct. 6, 1990 [JP] Japan .................. 2-268608

[51] Int. Cl.⁵ ...................... H04M 11/00; H04N 1/32
[52] U.S. Cl. ..................... 379/90; 379/355; 379/100; 379/386; 379/93; 358/435; 358/442
[58] Field of Search ............... 379/90, 387, 100, 97, 379/96, 94, 98, 355, 386, 93; 358/434, 435, 436, 438, 439, 442

[56] References Cited

U.S. PATENT DOCUMENTS 4,908,851 3/1990 Kotani et al. .................. 379/100

FOREIGN PATENT DOCUMENTS 0458540 11/1991 European Pat. Off. ........... 379/100

Primary Examiner—James L. Dwyer
Assistant Examiner—Paul A. Fournier
Attorney, Agent, or Firm—Fitzpatrick, Cella, Harper & Scinto

[57] ABSTRACT

A communication terminal adaptor, or an automatic dialer, for connecting a communication terminal such as a facsimile apparatus and a telephone line network, is capable of handling both the push button signal and the dial pulse signal in mixed manner, and transmitting the identification information of the communication terminal, stored in advance in the adaptor, upon receiving the tone prompt signal from the destination station without referring to the communication terminal. Thus the telephone connection can be made in simpler and more prompt manner.

12 Claims, 5 Drawing Sheets

COMMUNICATION TERMINAL ADAPTOR

BACKGROUND OF THE INVENTION

1. Field of the Invention

The present invention relates to a communication terminal adaptor to be used between a communication terminal such as a facsimile apparatus and a telephone network.

2. Related Background Art

An automatic dialer for telephone line (hereinafter referred to simply as autodialer) is a device present between a communication terminal such as a telephone unit with contracted dialing function or a facsimile apparatus of G3 format and a telephone network, for decoding the content of said contracted dialing and automatically dialing to the destination based on thus decoded in format ion.

Such conventional autodialer is provided with a memory for registering information for transmission, and sends a continuous signal in the form of a PB (push button) signal or a DP (dial pulse) signal to the telephone network, based on said information for transmission, when a key of the autodialer is manually operated or when the autodialer is activated from an operation of the terminal.

However, such conventional autodialer is designed, in case of transmitting the information registered in said memory to the telephone network, so as to release a group of information elements in the form of a continuous signal as explained above, so that the PB signal and the DP signal cannot be used in mixed manner in a group of information elements. Thus, if transmission of information by the PB signal is required in a communication channel for the DP signal, it is necessary to make connection with the destination by the autodialer with a DP signal and then to send the PB signal from the terminal.

Also in a VAN (value-added network) service or a server unit, in designating the service thereof or the ID information with a DTMF (dual-tone multifrequency) signal in the form of PB signal, it is often required to confirm a short signal (hereinafter called tone prompt signal) released from such apparatus, prior to the transmission of the DTMF signal. In such case, with the conventional autodialer, it is necessary to make the connection with the destination by the operation of said dialer, then to confirm the tone prompt signal transmitted from the telephone network by the terminal, and to transmit the DTMF signal from the terminal.

SUMMARY OF THE INVENTION

An object of the present invention is to improve the operability of the communication terminal adaptor.

Another object of the present invention is to provide a communication terminal adaptor capable of transmitting the DTMF signal at a suitable timing.

Still another object of the present invention is to provide a communication terminal adaptor capable of receiving desired services with simple operations or in prompt manner.

Still other objects of the present invention will become fully apparent from the following description of the embodiments.

DETAILED DESCRIPTION OF THE PREFERRED EMBODIMENTS

Now the present invention will be clarified in detail by preferred embodiments thereof.

Figure 1:
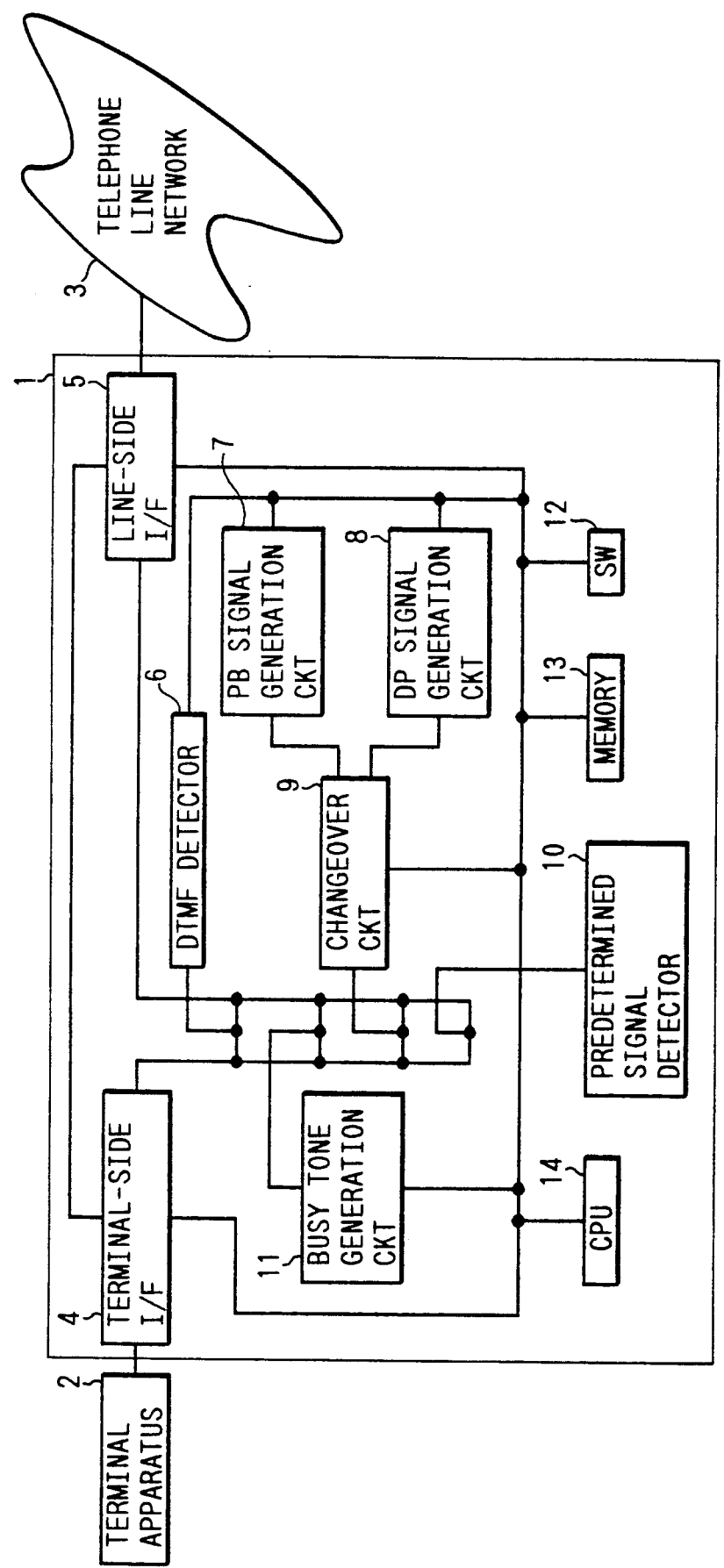
FIG. 1 is a block diagram of an automatic dialer for a telephone network embodying the present invention.

FIG. 1 is a block diagram of an automatic dialer embodying the present invention, adapted for use between a terminal apparatus 2 such as a G3-format facsimile apparatus or a telephone unit, and a telephone network 3.

There are provided a terminal-side interface 4 and line-side interface 5, which are provided with switching circuits ( not shown ) capable of directly connecting the terminal apparatus 2 and the telephone line network 3. The terminal-side interface 4 is further provided with a power supply circuit (not shown) for supplying the terminal apparatus 2 with an electric power equivalent to that for the telephone line network 3.

A DTMF detector 6 detects and decodes the DTMF signal from the terminal apparatus 2 and from the telephone line network (destination).

There are also provided a PB signal generation circuit 7 for transmitting PB signal; a DP signal generation circuit 8 for transmitting DP signal; and a changeover circuit 9 for switching a line for PB signal and a line for DP signal.

A predetermined signal detector 10 identifies state signals such a call signal, a line busy signal or a polarity inversion signal, transmitted from the telephone line network 3.

A busy tone generation circuit 11 sends a busy tone to the terminal apparatus 2 in case the destination is busy. A switch 12 sets the classification of the line, such as a line for PB signal or a line for DP signal.

A memory 13 stores address information (telephone numbers) and other identification codes in correspondence to contracted numbers. This information may be arbitrarily registered by the operator, by means of the switch 12. A CPU 14 controls the component unit explained above.

When the above-explained autodialer is used for example in a VAN service, the call from the terminal apparatus 2 to the telephone line network 3 is conducted in the following manner.

In a stand-by state, the terminal-side interface 4 and the line-side interface 5 are in a state not directly connecting the terminal apparatus 2 and the telephone line network 3.

At first, when the terminal-side interface 4 detects that the terminal apparatus 2 is in an off-hook state, said off-hook state is informed to the CPU 14. In response, the CPU 14 sends an activation command to the DTMF detector 6, which detects and decodes the dialing information transmitted by DTMF signal from the terminal apparatus 2 and stores the decoded information in the memory 13. When all of the DTMF signal has been received, the CPU 14 reads the dialing information from the terminal apparatus 2, stored in the memory 13, and compares it with address information (telephone numbers) in a registration table provided in another area of the memory 13. If address information corresponding to said dialing information is not registered, the dialing information from the terminal apparatus can be understood not to be a contracted dialing. In such case, therefore, the CPU 14 transmits the dialing information from the terminal apparatus 2 directly to the telephone line network 3, and controls the aforementioned switching circuits in the terminal-side interface 4 and the line-side interface 5 to directly connect the terminal apparatus 2 and the telephone line network 3.

In order to ensure the stability of transmission from the terminal apparatus 2, the power supply circuit of the terminal-side interface 4 is activated from the start of off-hook state of the terminal apparatus 2 to the direct connection of the terminal-side interface 4 and the line-side interface 5, whereby the terminal apparatus 2 is given an electric power equivalent to that given to the telephone line network 3. After the interfaces 4, 5 are directly connected, the power supply circuit of the terminal-side interface 4 is turned off, since electric power is supplied from the telephone line network 3 to the terminal apparatus 2.

The CPU 14 also identifies whether the telephone line network is set as a PB line or a DP line by the switch 12, and activates the PB signal generation circuit 7 or the DP signal generation circuit 8 through the change-over circuit 9, according to said identification, thereby sending either the PB signal or the DP signal to the telephone line network 3.

On the other hand, in case address information (telephone number) corresponding to the dialing information (contracted number) from the terminal apparatus 2 is registered in the registration table, the CPU 14 sends such corresponding address number to the telephone line network 3 and sends an activation command to the predetermined signal detector 10, which identifies state signals from the telephone line network 3, such as a call signal, a line busy signal or a polarity inversion signal. If a busy signal is transmitted from the telephone line network 3, the busy tone generation circuit 11 is activated to send a busy tone signal to the terminal apparatus 2, whereby entered is an on-hook awaiting state.

On the other hand, if a busy signal is not received from the telephone line network 3 so that the destination apparatus is not busy, the CPU 14 renders the DTMF detector 6 capable of receiving the DTMF (tone prompt) signal from the telephone line network 3. If the switch 12 selects the DP signal generation circuit 8 in this state, the changeover circuit 9 is shifted to select the PB signal generation circuit 7, thereby enabling the reception of said DTMF (tone prompt) signal. Subsequently, if said DTMF (tone prompt) signal is not received within a predetermined period, the switching circuits in the terminal-side interface 4 and the line-side interface 5 are activated to directly connect the terminal apparatus 2 and the telephone line network 3, whereby the on-hook awaiting state is entered. On the other hand, if said DTMF (tone prompt) signal is received within the predetermined period, the CPU 14 transmits various ID information stored in the registration table of the memory 13, and then directly connects the terminal apparatus 2 and the telephone line network as explained above, thereby entering the on-hook awaiting state.

Figure 2:
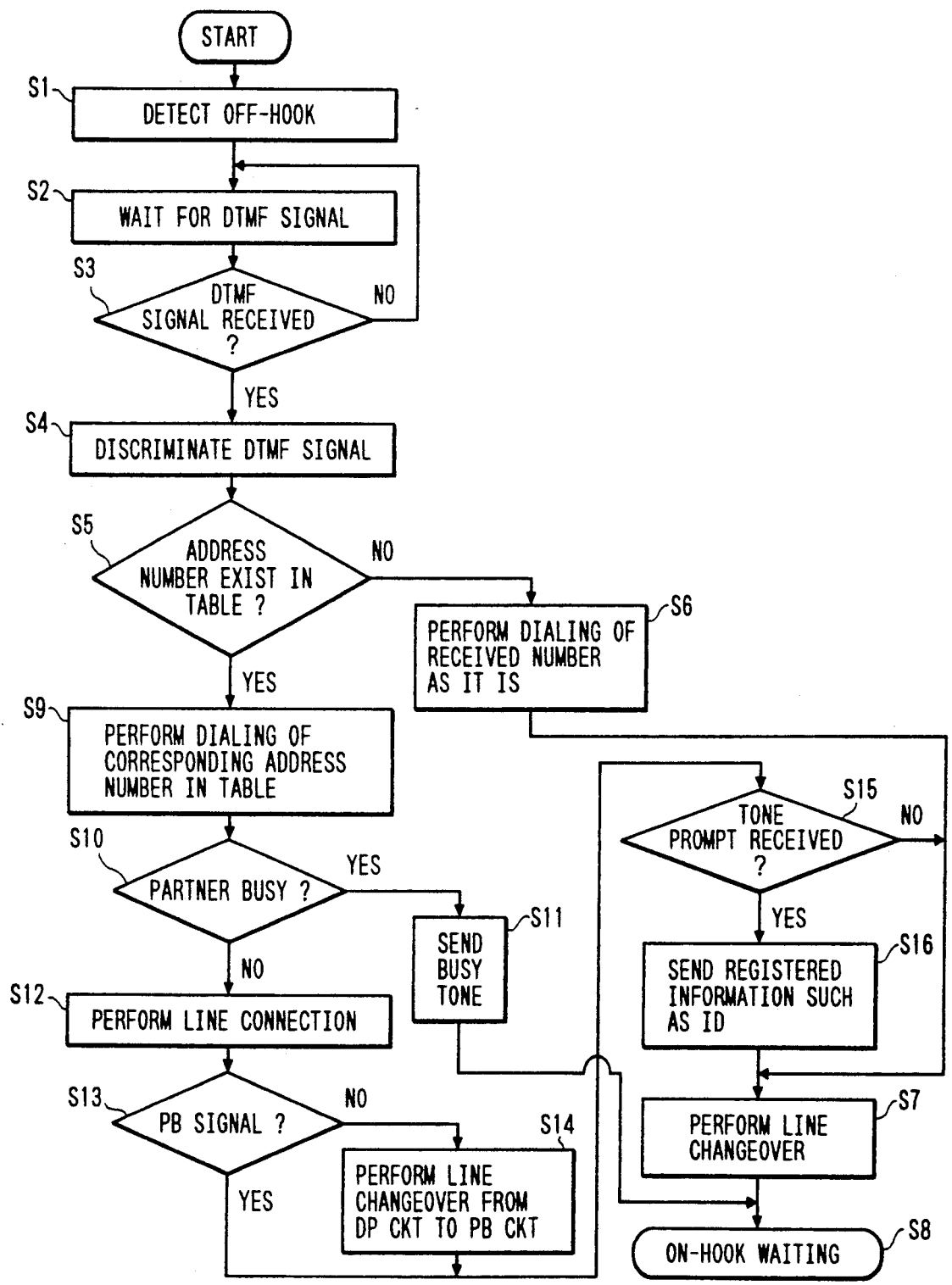
FIG. 2 is a flow chart showing the control sequence of said automatic dialer in a transmission.

FIG. 2 is a flow chart showing the control sequence of the above-explained autodialer in a transmitting operation.

At first the terminal-side interface 4 detects the off-hook state of the terminal apparatus (step S1). Upon being informed of said state, the CPU 14 activates the DTMF detector 6, which thus enters a state for awaiting the reception of a DTMF signal from the terminal apparatus (step S2). At the same time the CPU 14 controls the changeover circuit 9 so as to send a PB signal or a DP signal to the telephone line network 3 according to the setting of the switch 12.

Then the DTMF detector 6 discriminates whether the DTMF signal (dialing information) has been received (step S3), and, if received, the DTMF detector 6 decodes the received signal (step S4). Then the CPU 14 discriminates whether an address number corresponding to the received dialing information has been registered in the registration table (step S5). If the address number, corresponding to the dialing information of the received DTMF signal, is not registered in the registration table, the CPU 14 dials the received number without change (step S6), then activates the switching circuits of the terminal-side and line-side interfaces 4, 5 to switch the line thereby directly connecting the telephone line network 3 and the terminal apparatus 2 (step S7), and enters the on-hook awaiting state (step S8).

On the other hand, if the step S5 identifies that an address number corresponding to the dialing information received from the terminal apparatus 2 is registered in the registration table, the CPU 14 dials said address number (telephone number) stored in the registration table corresponding to the dialing information, and activates the predetermined signal detector 10 ( step S9 ).

Then said predetermined signal detector 10 discriminates whether the destination apparatus is busy (step S10). If busy, the busy tone generation circuit 11 is activated to send a busy tone signal to the terminal apparatus 2 ( step S11) and the on-hook awaiting state is entered (step S8). On the other hand, if the destination apparatus is not busy, a connection is made therewith through the telephone line network 3 (step S12). Then there is discriminated whether the PB signal has been selected by the switch 12 in the step S12 (step S13), and, if not (namely if DP signal is selected), the CPU 14 controls the changeover circuit 9 to switch the line from the DP signal generation circuit 8 to the PB signal generation circuit 7 (step S14). Subsequently the DTMF signal detector 6 is again activated to enter a state for awaiting the DTMF (tone prompt) signal from the telephone line network 3.

Then there is discriminated whether the tone prompt signal has been received from the telephone line network 3 within a predetermined period (step S15), and, if not, the destination apparatus is identified as an ordinary telephone terminal.

Subsequently the aforementioned switching circuits in the terminal-side interface 4 and the line-side interface 5 are activated to switch the line (step S7), thereby directly connecting the terminal apparatus 2 and the telephone line network 3 and entering the on-hook awaiting state (step S8).

In case the predetermined tone prompt signal is received from the telephone line network 3 within the predetermined period in the step S15, the CPU 14 reads information such as terminal ID, service ID, corresponding to the dialing information, from the registration table in the memory 13, and sends this information in the form of DTMF signal by controlling the PB signal generation circuit 7, to the destination apparatus such as VAN service or server unit through the telephone line network (step S16).

Subsequently the aforementioned switching circuits in the interfaces 4, 5 are activated to switch the line (step S7) as explained above, thereby directly connecting the terminal apparatus 2 with the telephone line network 3 (step S7) and entering the on-hook awaiting state (step S8).

In case of receiving a call from the telephone line network 3, the predetermined signal detector 10 detects a call signal, whereupon the terminal apparatus 2 and the telephone line network 3 are directly connected and there is entered a state awaiting the end of communication.

Figure 3:
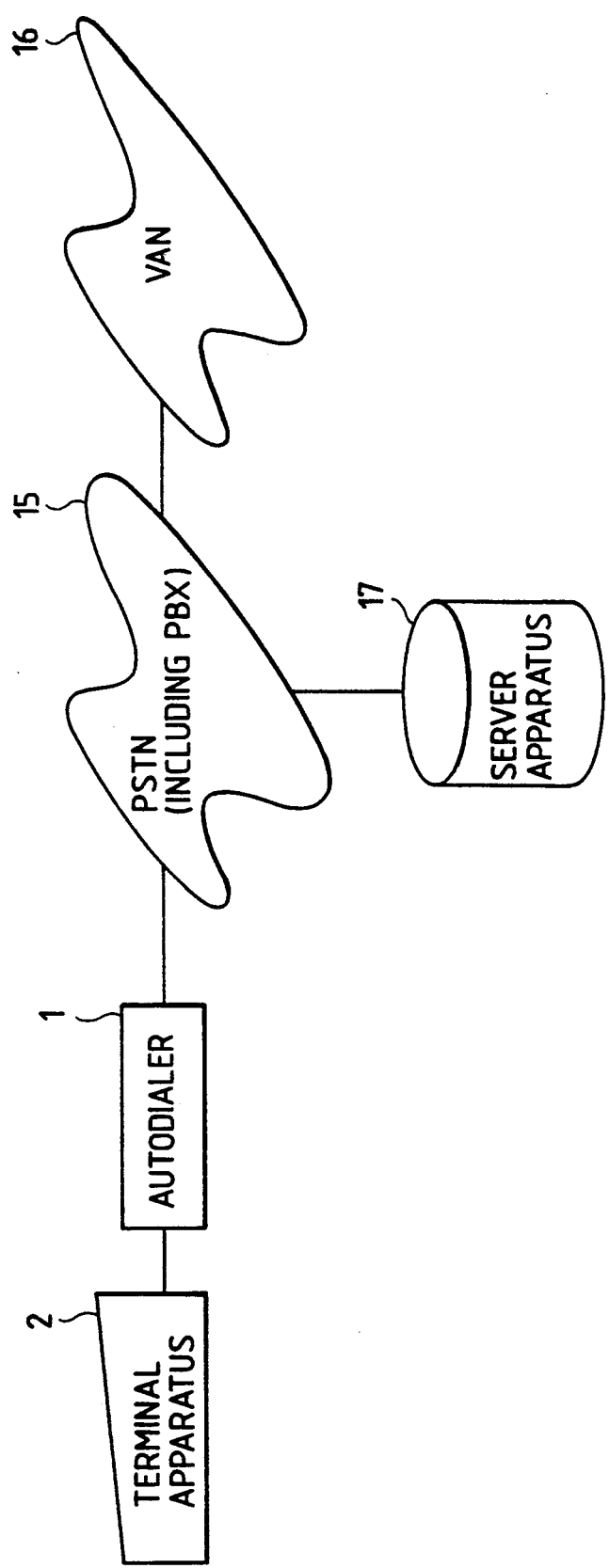
FIG. 3 is a block diagram of a network employing said automatic dialer.

FIG. 3 illustrates an example of the network structure embodying the autodialer of the present embodiment. In said network structure, the PSTN (public station telephone network) is employed as an example of the telephone line network 3, and predetermined information is transmitted from the terminal apparatus 2 to a VAN 16 or a server unit 17, through an autodialer 1 and said PSTN 15.

Figure 4:
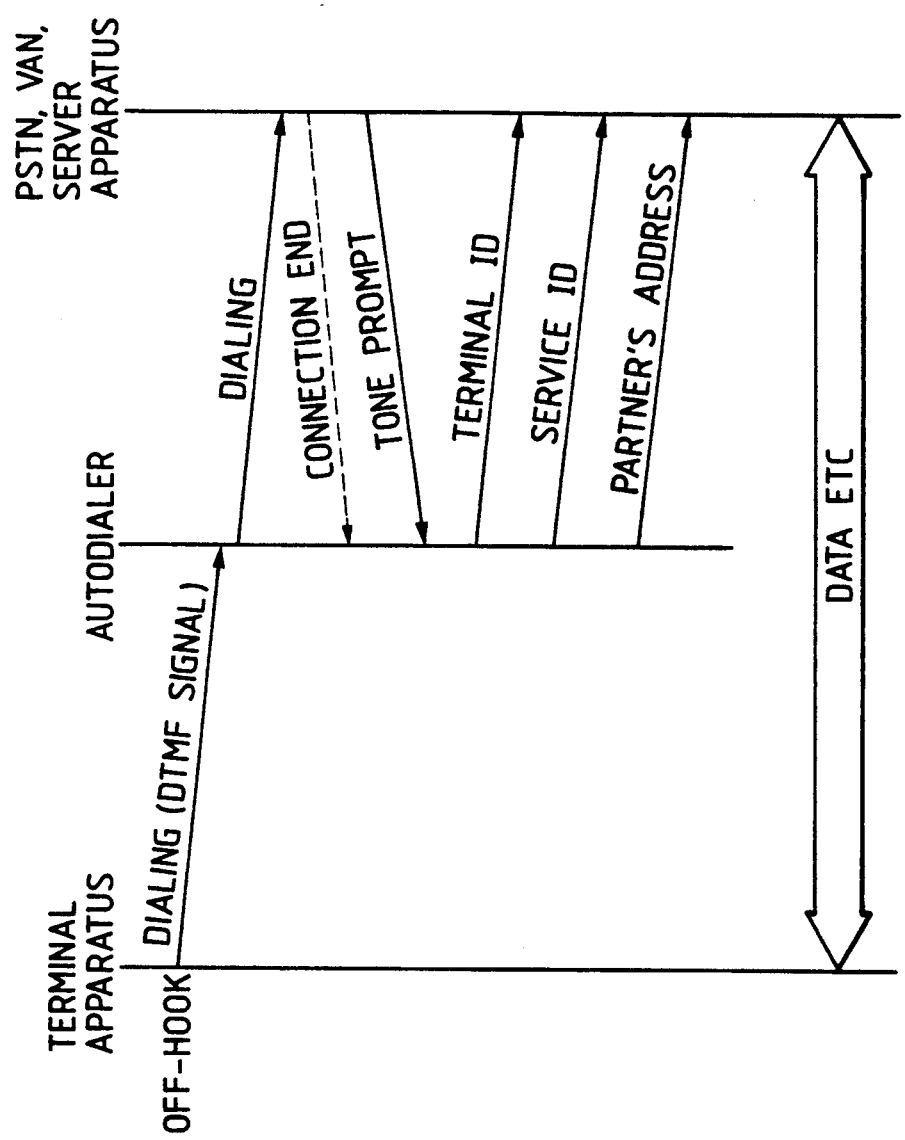
FIG. 4 is a view of a transmission sequence in said automatic dialer.

FIG. 4 shows an example of the communication sequence by the DTMF (PB) signal.

When dialing information by DTMF signal is entered from the terminal apparatus 2 in the off-hook state, the autodialer 1 sends an address number (telephone number) stored in the registration table of the memory 13 and corresponding to said dialing information, to the PSTN. After the connection with the VAN or the server unit is completed, the DTMF detector 10 receives the tone prompt signal. Thus the CPU 14 reads transmission information such as terminal ID, service ID etc. from the memory 13, thereby initiating the communication with the destination.

As explained in the foregoing, the autodialer 1 of the present embodiment compares the DTMF signal, received from the terminal apparatus 2 and decoded by the DTMF detector 6, with the address numbers (telephone numbers) stored in the memory 13, makes connection by sending a dialing signal in the form of PB or DP signal, based on the result of said comparison, to the telephone line network 3, and renders the DTMF detector 6 capable of receiving the DTMF signal from the telephone line network 3. Upon reception of the DTMF signal from the network 3, the ID information etc. stored in the memory 13 is transmitted, as the DTMF signal, to the telephone line network 3, whereby the line connection from the terminal apparatus 2 to the telephone line network 3 can be achieved in simple and prompt manner.

The present invention is not limited by the above-explained embodiment but is naturally subject to modifications within the essence of the present invention. Also the structure of network is not limited to that shown in FIG. 3 but is modifiable in various manners.

Figure 5:
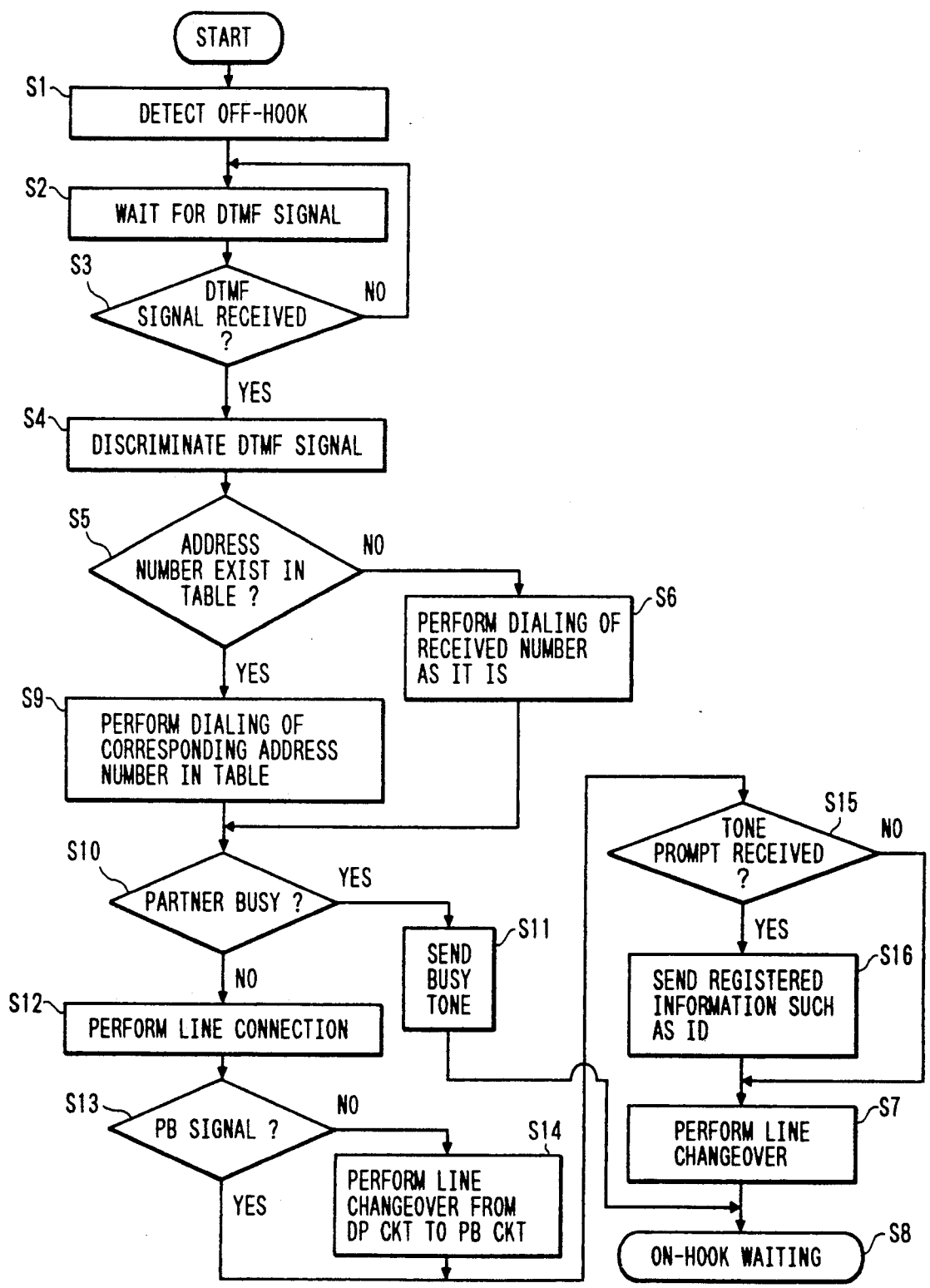
FIG. 5 is a flow chart of the control sequence of an automatic dialer constituting another embodiment of the present invention.

FIG. 5 is a flow chart of the control sequence of the autodialer 1 constituting another embodiment of the present invention. Said flow chart is different from that shown in FIG. 2 in that, even when the dialing information received from the terminal apparatus 2 is not registered as a contracted number in the memory 13, if it is received through the telephone line network 3 (step S6), the registered information such as ID is transmitted (step S16). Stated differently, if the connected destination unit is a VAN 16 or a server unit 17, the sequence may follow the flow chart shown in FIG. 5 if common registered information is emitted. Same applies if there is only one destination to which the registered information such as ID is to be transmitted.

Also, if the DTMF detector 6 is provided with function for detecting dialing pulses, the dialing information from the terminal apparatus 2 may be transmitted in the form of dialing pulses.

Though the present invention has been explained by the preferred embodiments thereof, it is not limited to such embodiments and is subject to various modifications within the spirit and scope of the appended claims.

What is claimed is:

1. A communication terminal adaptor for connecting a communication terminal and a telephone line network, comprising:
   a terminal interface for connecting a communication terminal and supplying electric power to the communication terminal;
   a line interface for connecting a telephone line network;
   connection means for connecting the communication terminal and the telephone line network;
   memory means for storing a dial number;
   reception means for receiving a first dialing signal from the communication terminal and a predetermined signal through the telephone line network; and
   transmission means for transmitting predetermined information through the telephone line network, upon reception of the predetermined signal by said reception means, in a case where the first dialing signal received by sad reception means corresponds to the dial number stored in said memory means.

2. A communication terminal adaptor according to claim 1, wherein sad transmission means is adapted to transmit a second dialing signal, corresponding to the dialing signal received by said reception means, to the telephone line network.

3. A communication terminal adaptor according to claim 1, wherein said transmission means is adapted, upon reception by said reception means of a predetermined signal transmitted by a destination station after connection therewith through the telephone line network, to transmit predetermined information corresponding to the dialing signal received by said reception means, to the destination station.

4. A communication terminal adaptor according to claim 1, wherein said predetermined signal is a tone prompt signal.

5. A communication terminal adaptor according to claim 1, wherein said predetermined information includes the identification code of the communication terminal.

6. A communication terminal adaptor according to claim 2, wherein the dialing signal received by said reception means is a contracted dialing number.

7. An adaptor according to claim 1, wherein said terminal interface supplies the electric power equivalent to that given from the telephone line network.

8. An adaptor according to claim 2, wherein said transmission means transmits the predetermined information if the predetermined signal is received after the second dialing signal is transmitted.

9. A communication terminal adaptor for connecting a communication terminal and a telephone line network, comprising:

a terminal interface for connecting the communication terminal;

a line interface for connecting the telephone line network;

connection means for connecting the communication terminal and the telephone line network;

memory means for storing a dial number;

reception means for receiving a first dialing signal from the communication terminal and a predetermined signal through the telephone line network; and transmission means for transmitting predetermined information through the telephone line network, upon reception of the predetermined signal by said reception means, in a case where the first dialing signal received by said reception means corresponds to the dial number stored in said memory means.

10. An adaptor according to claim 9, wherein the predetermined signal is a tone prompt signal.

11. An adaptor according to claim 9, wherein the predetermined information includes an identification code of the communication terminal.

12. An adaptor according to claim 9, wherein the first dialing signal received by said reception means is a contracted dialing number.

* * * * *

UNITED STATES PATENT AND TRADEMARK OFFICE
CERTIFICATE OF CORRECTION

PATENT NO. : 5,329,580
DATED : July 12, 1994
INVENTOR(S) : KANICHI YOSHINO

It is certified that error appears in the above-identified patent and that said Letters Patent is hereby corrected as shown below:

COLUMN 1

Line 19, "in format ion." should read --information--.

COLUMN 4

Line 51, "Subsequently" should read --Subsequently,--.
    Line 60, "Subsequently" should read --Subsequently,--.

COLUMN 5

Line 8, "Subsequently" should read --Subsequently,--.

COLUMN 6

Line 5, "emitted." should read --omitted.--
    Line 36, "sad" should read --said--.
    Line 40, "sad" should read --said--.

Signed and Sealed this

Twenty-eight Day of February, 1995

Attest:

BRUCE LEHMAN

*Attesting Officer*      *Commissioner of Patents and Trademarks*